(12) United States Patent
Gong et al.

(10) Patent No.: US 8,787,024 B2
(45) Date of Patent: Jul. 22, 2014

(54) ELECTRONIC DEVICE WITH EASILY DETACHABLE POWER MODULE

(75) Inventors: Xin-Hu Gong, Shenzhen (CN); Si-Wen Shu, Shenzhen (CN); Zheng-Bing Song, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 334 days.

(21) Appl. No.: 13/241,287

(22) Filed: Sep. 23, 2011

(65) Prior Publication Data

US 2012/0293966 A1    Nov. 22, 2012

(30) Foreign Application Priority Data

May 20, 2011    (CN) .......................... 2011 1 0130918

(51) Int. Cl.
*H05K 5/00* (2006.01)
(52) U.S. Cl.
USPC ....................................................... 361/730
(58) Field of Classification Search
USPC ....................................................... 361/730
See application file for complete search history.

(56) References Cited

U.S. PATENT DOCUMENTS

| 5,734,557 | A  | * | 3/1998  | McAnally et al. | 361/727 |
|-----------|----|---|---------|-----------------|---------|
| 6,275,382 | B1 | * | 8/2001  | Siedow et al.   | 361/727 |
| 7,064,951 | B2 | * | 6/2006  | Barile et al.   | 361/752 |
| 7,272,013 | B1 | * | 9/2007  | Sivertsen       | 361/752 |
| 7,679,934 | B2 | * | 3/2010  | Fan et al.      | 361/807 |
| 7,755,906 | B2 | * | 7/2010  | Sato            | 361/747 |
| 7,898,819 | B2 | * | 3/2011  | Pfingsten et al.| 361/800 |
| 8,411,446 | B2 | * | 4/2013  | Becklin         | 361/730 |
| 8,411,447 | B2 | * | 4/2013  | Turner          | 361/730 |
| 8,456,845 | B2 | * | 6/2013  | Liu             | 361/727 |
| 2006/0238988 | A1 | * | 10/2006 | Wobig et al. | 361/756 |

* cited by examiner

*Primary Examiner* — Forrest M Phillips
(74) *Attorney, Agent, or Firm* — Novak Druce Connolly Bove + Quigg LLP (57) ABSTRACT

An electronic device includes a casing with a side plate and encasing a power module. The power module includes a locking member and a sliding member sandwiched between the base and the cover and abutting the locking member. The sliding member is movable relative to the locking member, between a locked position in which the locking portion of the locking member is pushed by the sliding member to extend through the cover to be locked by the side plate of the casing, and an unlocked position in which the locking portion of the locking member is pressed by the sliding member to withdraw from the side plate to allow removal of the power module from the casing.

11 Claims, 10 Drawing Sheets

ELECTRONIC DEVICE WITH EASILY DETACHABLE POWER MODULE

BACKGROUND

1. Technical Field

The disclosure relates to electronic devices, and particularly to an electronic device with an easily detachable power module.

2. Description of the Related Art

An electronic device, such as a desktop computer, tower computer, server, or the like, usually includes power modules for connecting to a power supply. The installation of the power module in a computer typically involves the use of screws. However, power modules installed by screws may fit too tightly and can not be drawn out easily.

What is needed, therefore, is an electronic device which can overcome the limitations described.

DETAILED DESCRIPTION

Reference will be made to the drawing figures to describe the present electronic device in detail.

Figure 1:
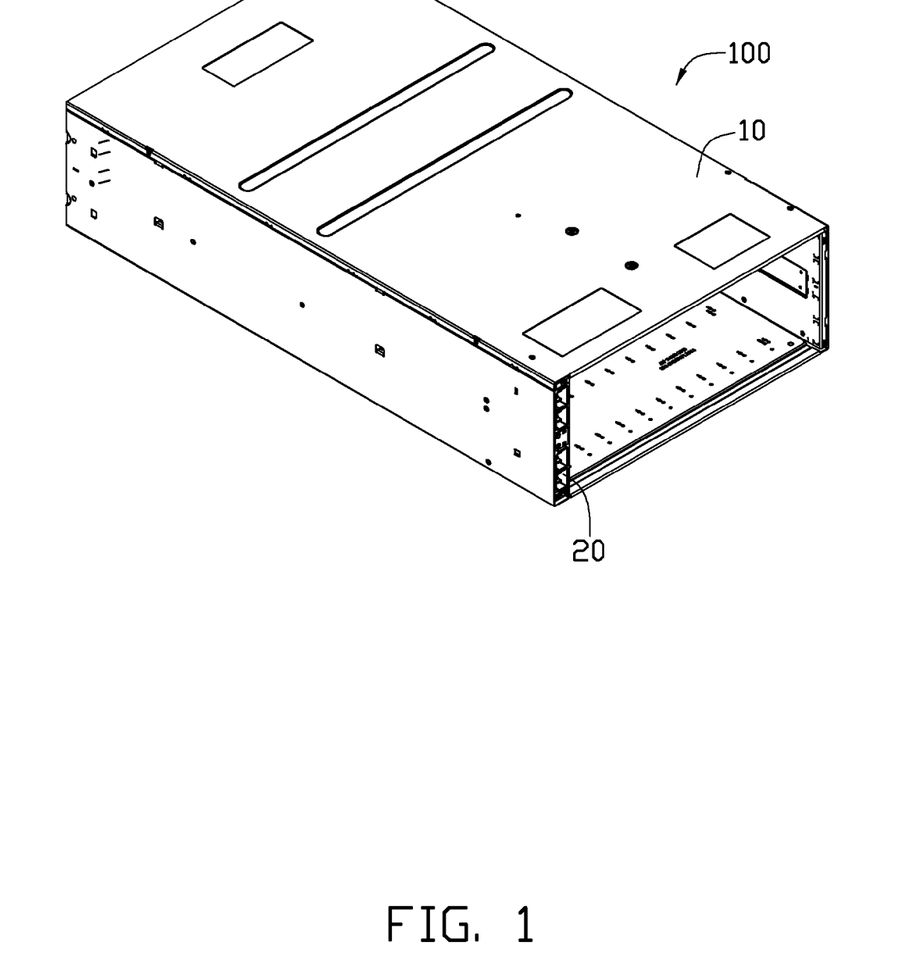
FIG. 1 is an isometric view of an assembled electronic device in accordance with an exemplary embodiment.

Referring to FIG. 1, an electronic device 100 in accordance with an exemplary embodiment includes a casing 10 and a power module 20 in the casing 10. The electronic device 100 can be, for example, a server or a computer.

Figure 2:
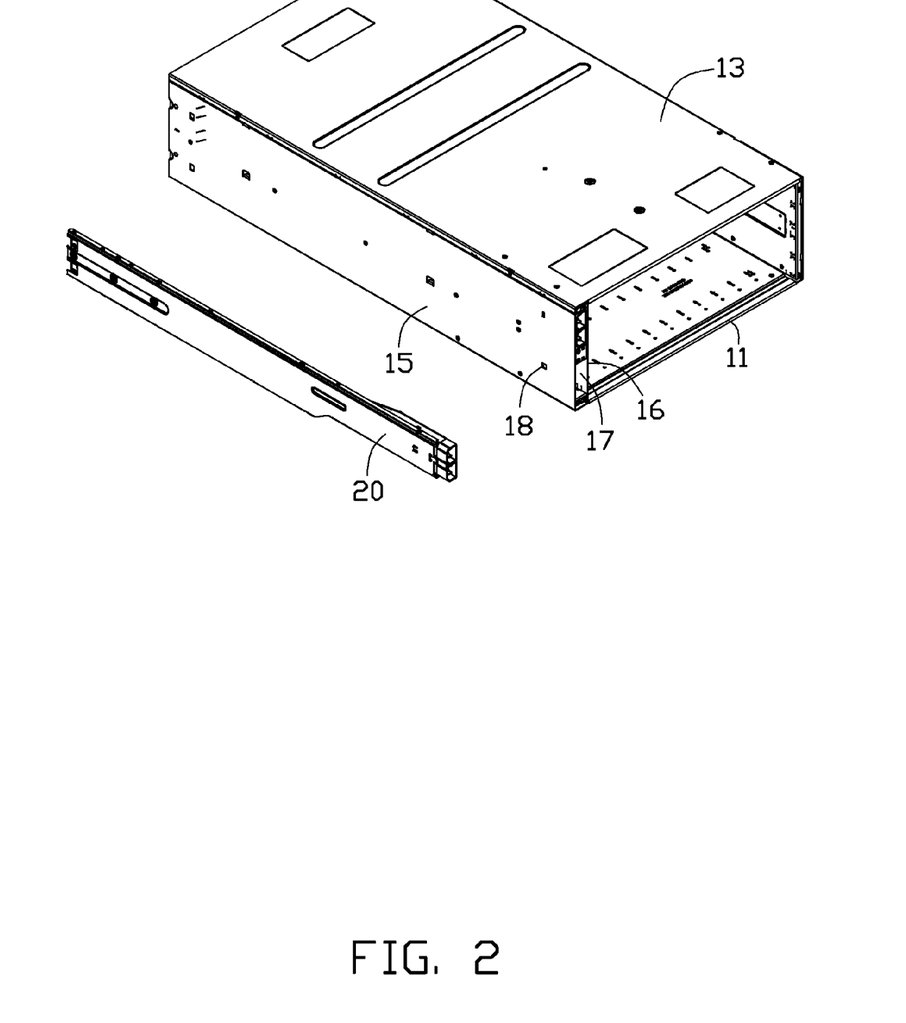
FIG. 2 is an exploded view of a power module and a casing of the electronic device of FIG. 1.

Referring to FIG. 2, the casing 10 includes a bottom plate 11, a top plate 13 and two side plates 15, 16 connecting the bottom plate 11 with the top plate 13. A receiving room 17 is defined between the side plates 15, 16. The side plate 15 defines a fixing hole 18 communicating with the receiving room 17. The power module 20 is received in the receiving room 17.

Figure 3:
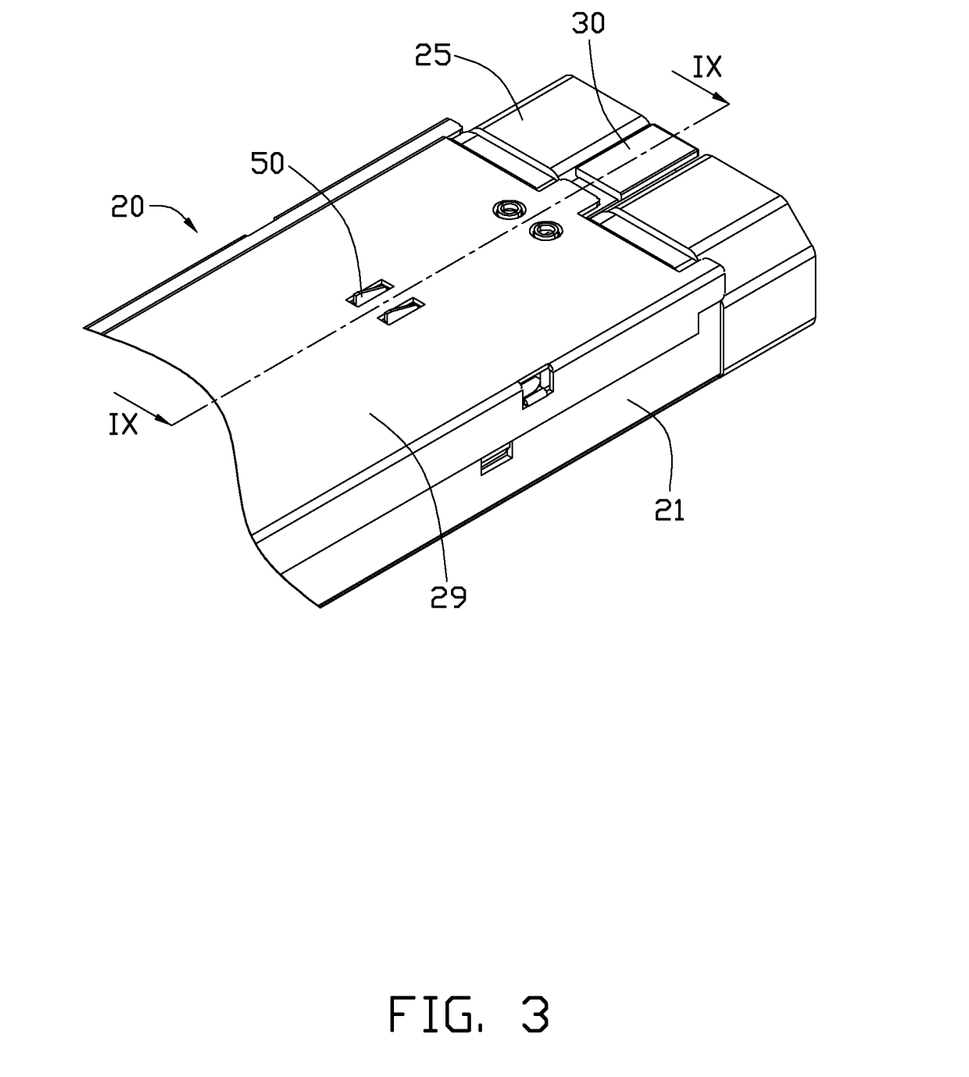
FIG. 3 is a view of part of the assembled power module of FIG. 2, shown from a different aspect.

Referring to FIG. 3, the power module 20 includes a base 21, a cover 29, two power connectors 25, a sliding member 30 and a locking member 50. The cover 29 attaches to the base 21 so as to sandwich the connector 25, the sliding member 30 and the locking member 50.

Figure 4:
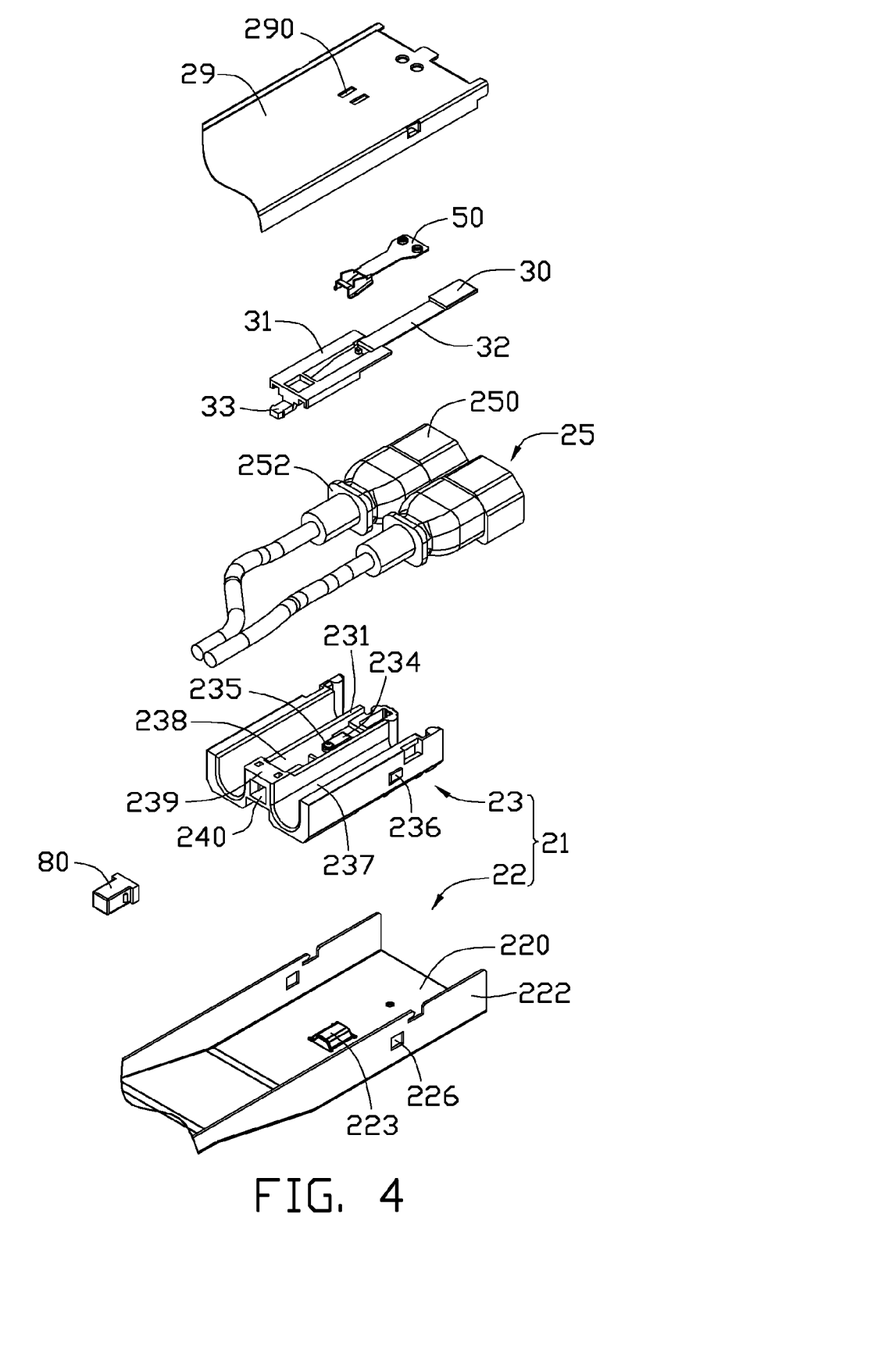
FIG. 4 is an exploded view of the power module of FIG. 3.
Figure 5:
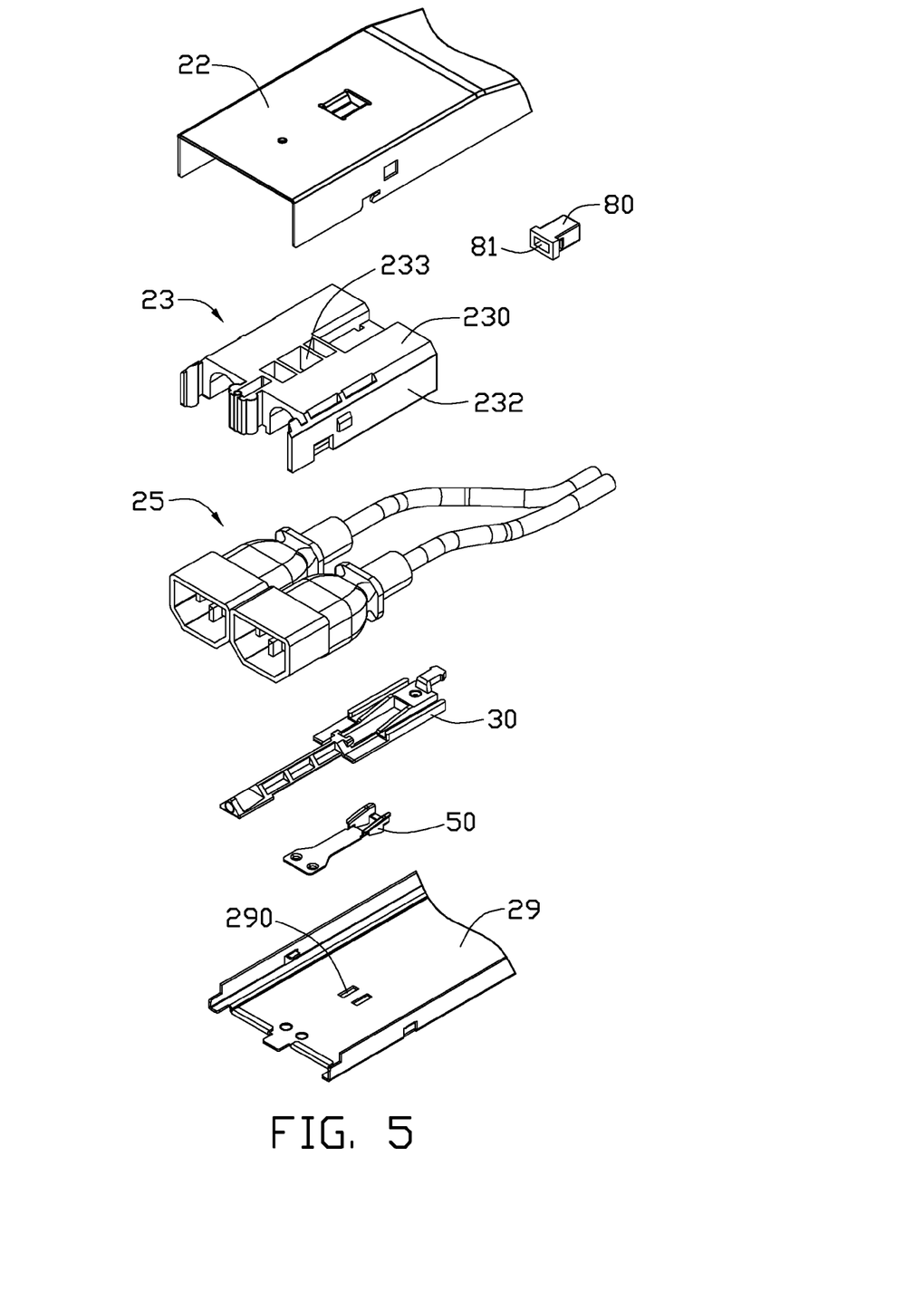
FIG. 5 is an inverted view of the power module of FIG. 4.

Referring to FIGS. 4-5, the cover 29 defines a pair of holes 290 therein. The base 21 includes a bracket 22 and a securing member 23 received in the bracket 22. The bracket 22 includes a bottom wall 220 and two lateral walls 222 extending upwards from the two opposite sides of the bottom wall 220. The bottom wall 220 has a protrusion 223 extending up from a central portion thereof. Each of the lateral walls 222 defines a through hole 226 therein.

The securing member 23 is received in the bracket member 22 and defines a fixing hole 233 in the bottom surface thereof to receive the protrusion 223. Two blocking portions 236 extend outwards from the two sides of the securing member 23 into the through holes 226 of the bracket member 22. Thereby, the securing member 23 may be secured in the bracket member 22. The securing member 23 defines a rectangular receiving groove 238 thereon and two U-shaped receiving grooves 237 flanking the receiving groove 238. Two middle walls 231 extend respectively from a top surface of the securing member 23 on either side of the receiving groove 238. The middle walls 231 are parallel. A connecting wall 239 connects the rear ends of the middle side walls 231. The connecting wall 239 defines a locating hole 240 communicating with the receiving groove 238. A fixing member 80 is mounted in the locating hole 240, an opening 81 is defined in an end of the fixing member 80, facing the receiving groove 238. An elastic portion 234 extends from the securing member 23 in the receiving groove 238 and away from the locating hole 240. A latching portion 235 extends upwards from a free end of the elastic portion 234.

The connectors 25 are received in the receiving grooves 237. Each of the connectors 25 includes a head portion 250 and an end portion 252. The end portions 252 are received and mounted in the receiving grooves 237 of the securing member 23. The head portions 250 are mounted beyond the front edge of the securing member 23. The sliding member 30 is movably engaged between the power connectors 25.

Figure 6:
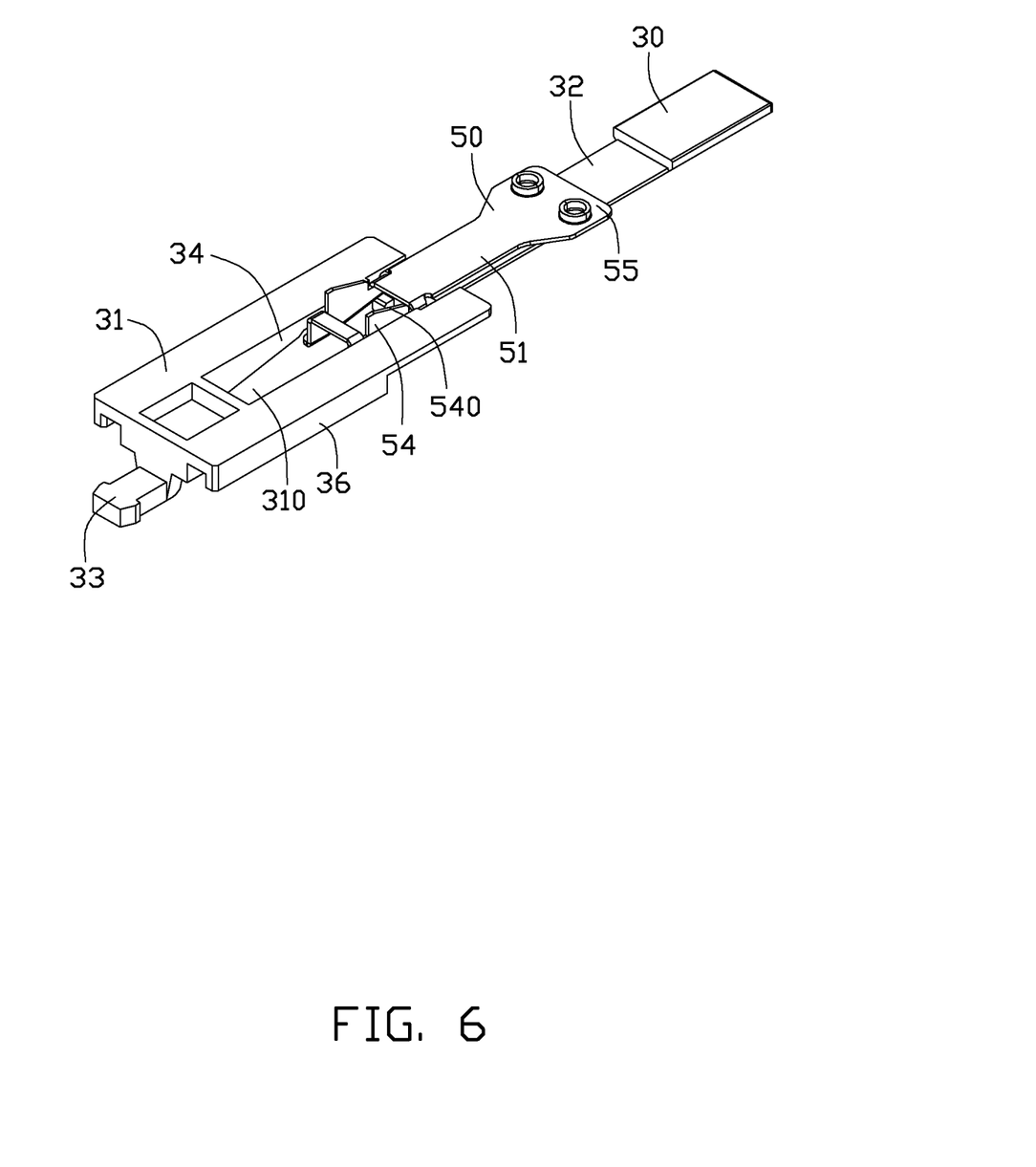
FIG. 6 is a view of a sliding member and a locking member of the power module of FIG. 4, assembled together.
Figure 7:
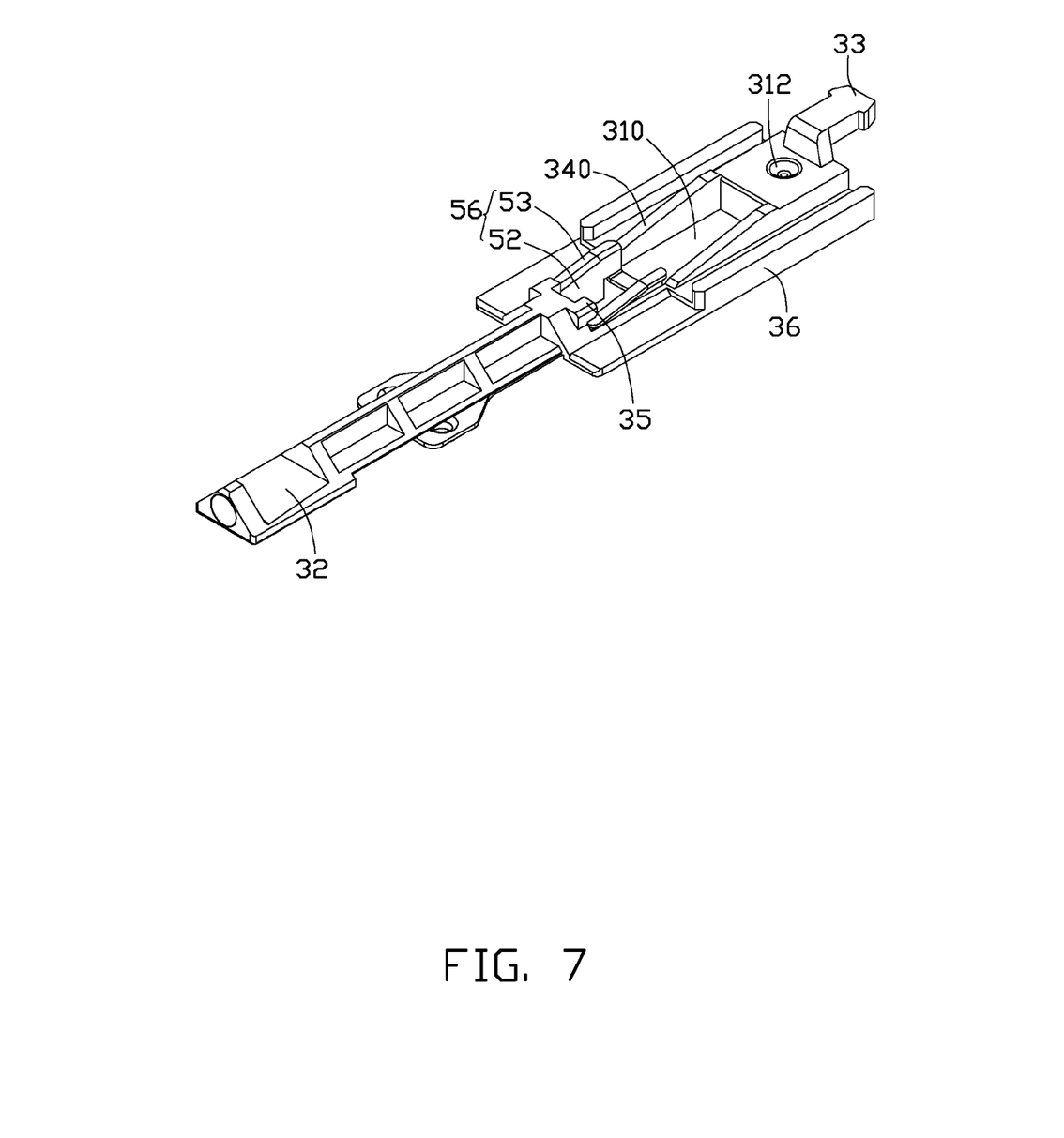
FIG. 7 is an inverted view of the sliding member and the locking member of FIG. 6.

Referring to FIGS. 6 and 7, the sliding member 30 includes a rectangular body 31, an operating portion 32 and an inserting portion 33. The operating portion 32 extends lengthways from an end of the body 31, and the inserting portion 33 extends from the other end of the body 31 opposite to the operating portion 32. The body 31 defines a slot 310 through the top and bottom thereof. The slot 310 in the body 31 has two parallel sidewalls 34. Each of the sidewalls 34 has a bottom pressing edge 340 gradually slanting down from the front end to the rear end thereof.

The body 31 includes two supporting portions 35 extending from an end thereof near to the operating portion 32. The body 31 defines a concave portion 312 at the bottom surface near the inserting portion 33. Two side plates 36 extend downwards from the two edges of the body 31. The side plates 36 are located outside the sidewalls 34.

The locking member 50 includes an elongated elastic arm 51, two engaging plates 56 extending from an end of the elastic arm 51, and two locking portions 54 extending upwards from the engaging plates 56. The locking portions 54 integrally connect the engaging plates 56. The elastic arm 51 has a securing end 55 opposite to the engaging plates 56. The securing end 55 is riveted to the cover 29. The engaging plates 56 are received in the slot 310 of the body 31. Each of the engaging plates 56 includes a connecting wall 52 connecting the elastic arm 51, and a flange 53 extending outwards from the bottom edge of the connecting wall 52. Each of the flanges 53 extends perpendicularly outwards from the connecting wall 52. Each of the locking portions 54 has a triangular profile. The top edge 540 of each locking portion 54 inclines upwards from the end near the elastic arm 51 to the other end. The locking portions 54 will extend through the through holes 290 of the cover 29 to beyond the top surface of the cover 29.

Figure 8:
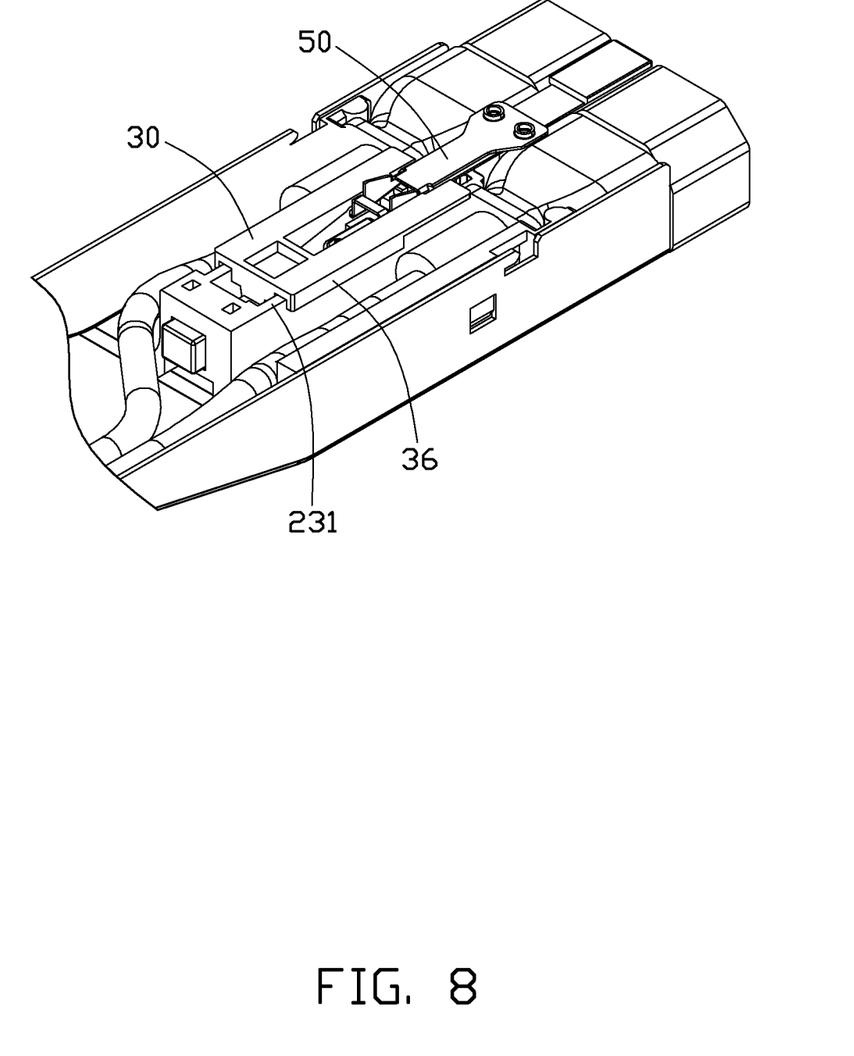
FIG. 8 is similar to FIG. 3, but showing the cover removed from the power module.

Referring also to FIG. 8, in assembling the power module 20, the securing member 23 is received in the bracket 22. The end portions 252 of the connectors 25 are received in the receiving grooves 237 of the securing member 23. The operating portion 32 of the sliding member 30 is mounted between the head portions 250 of the connectors 25. The body 31 is mounted on the securing member 23. The middle walls 231 are each received between the side plates 36 and the sidewalls 34 of the sliding member 30. The sliding member 30 can accordingly slide along the middle walls 231. The inserting portion 33 is movably received in the opening 81 of the fixing member 80. In this embodiment, the fixing member 80 can be a locating device with a blocking portion (not shown) and a spring (not shown) therein. When the inserting portion 33 is initially pushed towards the fixing member 80, the inserting portion 33 is received in the opening 81 and retained by the blocking portion of the fixing member 80; when the inserting portion 33 is pushed again towards the fixing member 80 a second time, the inserting portion 33 is disengaged with the blocking portion and pushed by the spring of the fixing member 80 and separated away from the fixing member 80.

The securing end 55 of the locking member 50 is fastened with the cover 29, with the elastic arm 51 abutting against the cover 29 and the locking portions 54 extending through the through holes 290. The engaging plates 56 are received in the slot 310 of the body 31 and between the sidewalls 34 and the supporting portions 35. The rear ends of the flanges 53 engage and support the pressing edges 340 of the sidewalls 34, and the front ends of the flanges 53 engage and press the supporting portions 35, shown in FIG. 7. The sidewalls 34 and the engaging plates 56 are received in the receiving groove 238 of the securing member 23.

Figure 9:
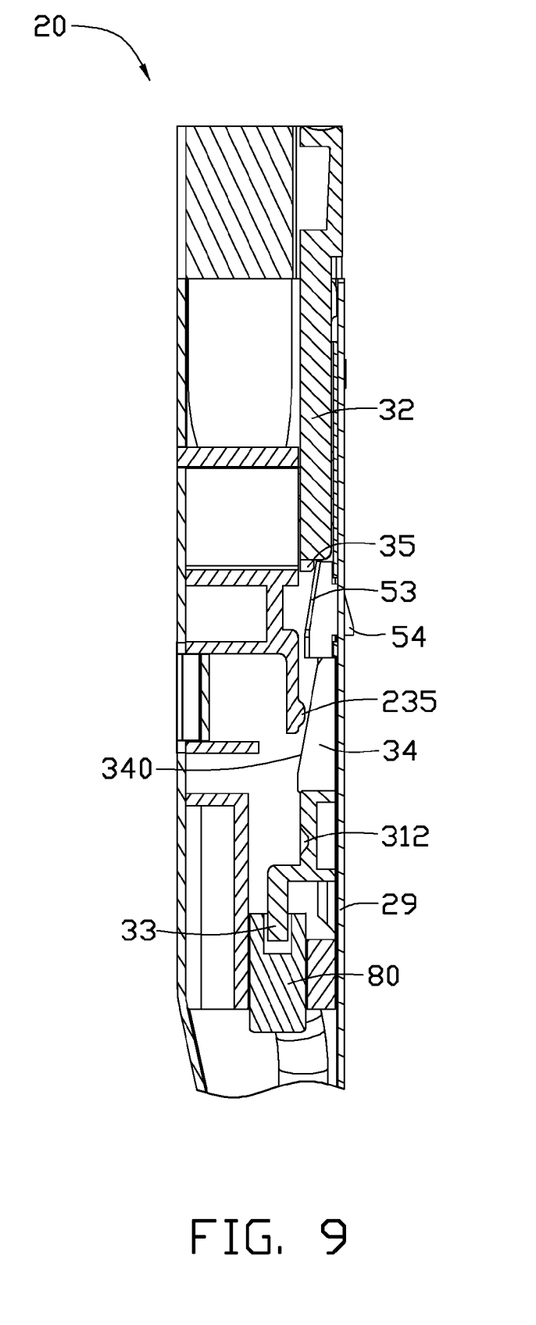
FIG. 9 is a cross-sectional view of the power module of FIG. 3, taken along a line IX-IX thereof, and showing the locking member of the power module in a locked position.
Figure 10:
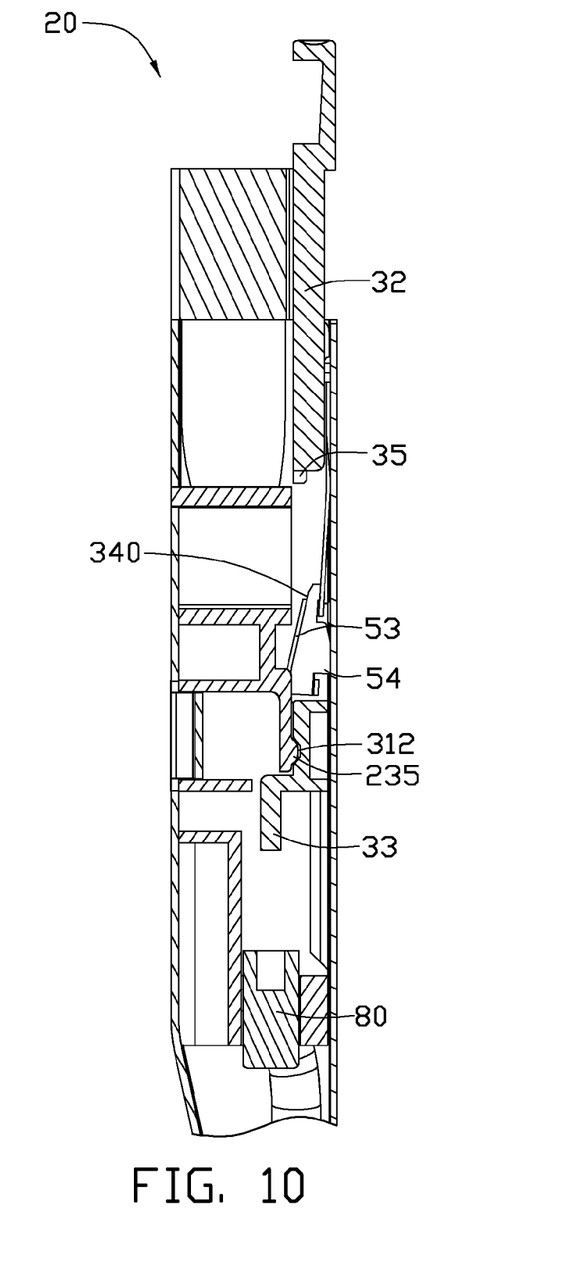
FIG. 10 is similar to FIG. 9, but showing the locking member in an unlocked position.

Referring also to FIG. 9, in a first (closed) state of the power module 20, the locking member 50 is in a locked position when the front end of the sliding member 30 is coplanar with the front ends of the head portions 250 of the connectors 25. In the first state, the supporting portions 35 of the sliding member 30 support the flanges 53, causing the locking portions 54 to protrude upwards through the through holes 290 and beyond the top surface of the cover 29. When the power module 20 needs to be unlocked (a second state), the operating portion 32 is pushed inwards to make the inserting portion 33 slide towards the fixing member 80. The inserting portion 33 is pushed back by the fixing member 80 and separated away from the fixing member 80. The sliding member 30 slides to the front end relative to the locking member 50, allowing the flanges 53 to disengage from the supporting portions 35 and abut the pressing edges 340. The sliding member 30 is then pulled outwards to bring the inclined pressing edges 340 to the front end and press down the flanges 53 of the engaging plates 56. The locking portions 54 follow the engaging plates 56 down and are disengaged from the through holes 290 of the cover 29. Simultaneously, the latching portion 235 of the securing member 23 is elastically engaged in the concave portion 312 of the sliding member 30. Thus, the locking member 50 is unlocked, as shown in FIG. 10.

Referring again to FIGS. 1-2, in use, the power module 20 is received in the receiving room 17 of the casing 10 in the first (closed) state. The locking portions 54 of the locking member 50 protrude beyond the cover 29 and are locked in the fixing hole 18 of the side plates 15 to secure the power module 20 in the casing 10. In disassembly, the power module 20 is turned to the second state with the locking member 50 unlocked by operating the sliding member 30. The locking portions 54 are disengaged from the fixing hole 18 of the side plates 15; thus, the power module 20 can be withdrawn from the casing 10. Without using any tools, the power module 20 can be fixed to and disassembled from the electronic device 100.

As described above, when a user or operator uses finger pressure to operate the sliding member 30, the power module 20 can be driven to slide from the casing 10. Therefore, the attachment and detachment of the power module 20 for this electronic device is very user-friendly.

It is to be further understood that even though numerous characteristics and advantages have been set forth in the foregoing description of the embodiment(s), together with details of the structures and functions of the embodiment(s), the disclosure is illustrative only; and that changes may be made in detail, especially in the matters of shape, size, and arrangement of parts within the principles of the disclosure to the full extent indicated by the broad general meaning of the terms in which the appended claims are expressed.

What is claimed is:

1. An electronic device, comprising:
a casing comprising a side plate; and
a power module attached to the side plate of the casing, the power module comprising:
a base;
a cover engaged with the base;
a connector mounted between the base and the cover;
a locking member comprising a securing end fixed on the cover and a locking portion opposite to the securing end; and
a sliding member sandwiched between the base and the cover and abutting the locking member;
wherein the sliding member is movable relative to the locking member and the cover between a locked position in which the locking portion of the locking member is pushed by the sliding member to extend through the cover to be blocked by the side plate of the casing, and an unlocked position in which the locking portion of the locking member is pressed by the sliding member to withdraw from the side plate to allow removal of the power module from the casing, wherein the locking member comprises an engaging plate connecting the locking portion, the sliding member comprises a supporting portion pushing the engaging plate to the cover in the locked position, and an inclined pressing edge pressing the engaging plate away from the cover in the unlocked position; and wherein the sliding member has a concave portion and the base comprises a latching portion elastically engaged in the concave portion when the sliding member is in the unlocked position.

2. The electronic device of claim 1, wherein the pressing edge gradually depresses from an end thereof near the engaging plate of the locking member to an opposite end of the pressing edge.

3. The electronic device of claim 2, wherein the engaging plate extends slantwise corresponding to the pressing edge.

4. The electronic device of claim 1, wherein the sliding member defines a slot receiving the engaging plate, the engaging plate positioned between the pressing edge and the supporting portion.

5. The electronic device of claim 1, wherein the sliding member comprises a body, an operating portion connecting one end of the body, and an inserting portion connecting the other end of the body and opposite to operating portion, the body comprises the supporting portion and the pressing edge.

6. The electronic device of claim 5, wherein the base comprises a fixing member retaining the inserting portion when the inserting portion is pushed towards the fixing member at a first time, and pushing the inserting portion to separate away from the fixing member when the inserting portion is pushed towards the fixing member at a second time.

7. The electronic device of claim 1, wherein the sliding member comprises two side plates extending in the base and movable relative to the base.

8. An electronic device, comprising:
a casing; and
a power module received in the casing, the power module comprising:
- a base;
- a cover engaged with the base;
- at least a connector mounted between the base and the cover;
- a locking member comprising a securing end fixed on the cover and two locking portions opposite to the securing end; and
- a sliding member sandwiched between the base and the cover and engaged with the locking member;

wherein the sliding member is movable relative to the locking member and the cover between a locked position in which the locking portions of the locking member are pushed by the sliding member to extend through the cover to be blocked by the casing, and an unlocked position in which the locking portions of the locking member are pressed by the sliding member to withdraw from the casing to allow removal of the power module from the casing, wherein the locking member comprises two engaging plates respectively connecting the locking portions, the sliding member comprising a supporting portion pushing the engaging plate to the cover in the locked position, and two sidewalls pressing the engaging plates away from the cover in the unlocked position; and wherein the sliding member has a concave portion and the base comprises a latching portion elastically engaged in the concave portion when the sliding member is in the unlocked position.

9. The electronic device of claim 8, wherein each of the sidewalls of the locking member has a pressing edge gradually depresses from an end thereof near the engaging plates of the locking member to an opposite end of the sidewall, the pressing edge presses a respective engaging plate away from the cover in the unlocked position.

10. The electronic device of claim 9, wherein the engaging plates extend slantwise corresponding to the pressing edges of the sidewalls.

11. The electronic device of claim 8, wherein the sliding member defines a slot receiving the engaging plates, the engaging plates positioned between the pressing edges and the supporting portion.

* * * * *